United States Patent
Juhanak et al.

(10) Patent No.: US 11,644,166 B2
(45) Date of Patent: May 9, 2023

(54) LIGHT-GUIDING OPTICAL UNIT FOR A LIGHT DEVICE OF MOTOR VEHICLES

(71) Applicant: Varroc Lighting Systems, s.r.o., Senov U Noveho Jicina (CZ)

(72) Inventors: Michal Juhanak, Koprivnice (CZ); Tomas Gloss, Vitkov (CZ); Jakub Hruska, Hlucin (CZ)

(73) Assignee: Varroc Lighting Systems, S.r.o., Senov U Noveho Jicina (CZ)

( * ) Notice: Subject to any disclaimer, the term of this patent is extended or adjusted under 35 U.S.C. 154(b) by 0 days.

(21) Appl. No.: 17/215,063

(22) Filed: Mar. 29, 2021

(65) Prior Publication Data
US 2021/0301994 A1    Sep. 30, 2021

(30) Foreign Application Priority Data
Mar. 30, 2020 (CZ) ............................... CZ2020-178

(51) Int. Cl.
*F21S 41/24*    (2018.01)
*F21S 41/33*    (2018.01)

(52) U.S. Cl.
CPC ............. *F21S 41/24* (2018.01); *F21S 41/337* (2018.01)

(58) Field of Classification Search
CPC ... G02B 6/0036; G02B 6/0038; G02B 6/0046
See application file for complete search history.

(56) References Cited

U.S. PATENT DOCUMENTS

| | | | |
|---|---|---|---|
| 6,049,649 A | 4/2000 | Arai | |
| 7,160,010 B1 | 1/2007 | Chinniah et al. | |
| 10,731,815 B2 * | 8/2020 | Kim | F21S 41/30 |
| 2002/0005991 A1 | 1/2002 | Masaki et al. | |

(Continued)

FOREIGN PATENT DOCUMENTS

| | | |
|---|---|---|
| CZ | 307329 B6 | 6/2019 |
| CZ | 307985 B6 | 10/2019 |
| WO | 2018189086 A1 | 1/2019 |

OTHER PUBLICATIONS

Search Report dated Aug. 24, 2020, from Corresponding Czech Patent Application No. PV 2020-178 (3 pages).

*Primary Examiner* — Eric T Eide
(74) *Attorney, Agent, or Firm* — Hovey Williams LLP

(57) ABSTRACT

The light-guiding optical unit (1) for a light device of motor vehicles comprises a light guide (2) that comprises at least one routing surface (3), and at least one light source (4) to generate light rays (10). The light-guide (2) further comprises a top surface (12) at least a part of which is constituted by the output surface (15), and a bottom surface (13) opposite the top surface (12) and fitted with a prismatic structure (16) comprising reflective surfaces (7). The routing surface (3) and the reflective surfaces (7) are mutually arranged in such a way that the routing surface (3), by means of routing by refraction on this surface (3) or reflection from this surface (3), directs light rays (10) to the prismatic structure (16) in such a way that it directly lights up only the reflective surfaces (7) with the light rays (10), the reflective surfaces (7) being configured to direct light rays (10) that have fallen onto them this way directly from the routing surface (3) to the output surface (15) in such a way that the light rays (10) can exit from the light guide (2) through the output surface (15).

18 Claims, 23 Drawing Sheets

(56) References Cited

U.S. PATENT DOCUMENTS

Figure 1:
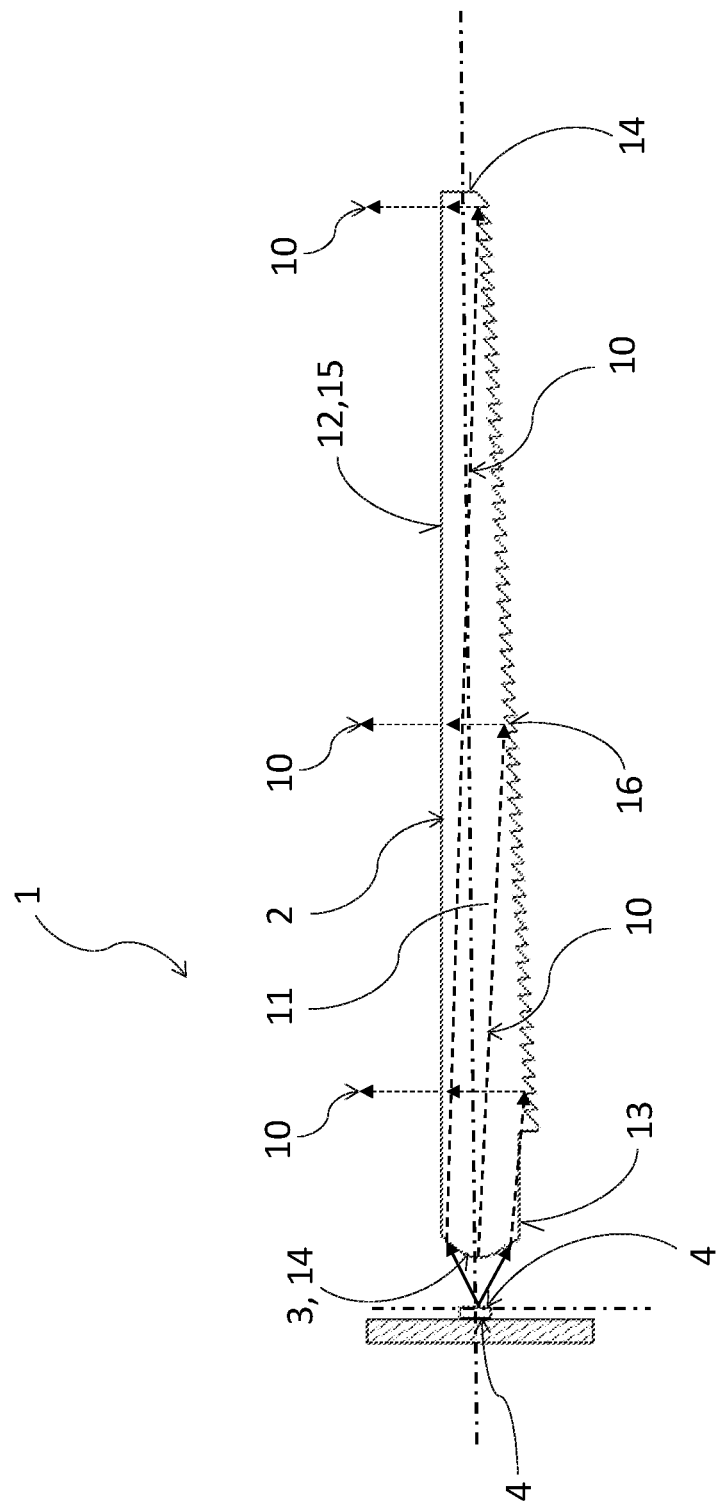

| | | | |
|---|---|---|---|
| 2002/0071267 A1 | 6/2002 | Lekson et al. | |
| 2006/0061869 A1* | 3/2006 | Fadel | G02F 1/133526 359/619 |
| 2006/0164839 A1* | 7/2006 | Stefanov | F21S 43/26 362/327 |
| 2007/0230216 A1 | 10/2007 | Ite et al. | |
| 2010/0134720 A1* | 6/2010 | Choi | G02B 5/0221 349/64 |
| 2017/0363909 A1* | 12/2017 | Hirayama | G02B 6/0038 |
| 2019/0212560 A1* | 7/2019 | Sugiyama | G02B 6/0028 |
| 2019/0389364 A1* | 12/2019 | Shah | F21S 43/315 |

\* cited by examiner

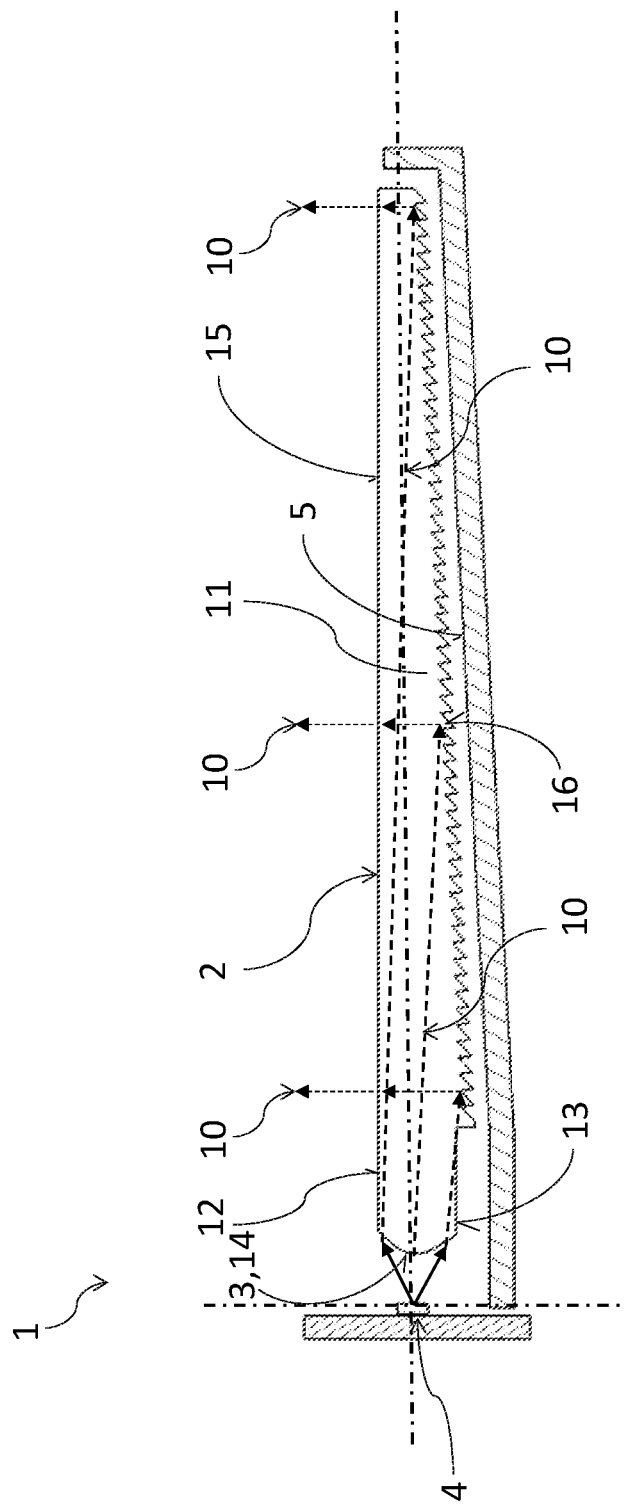

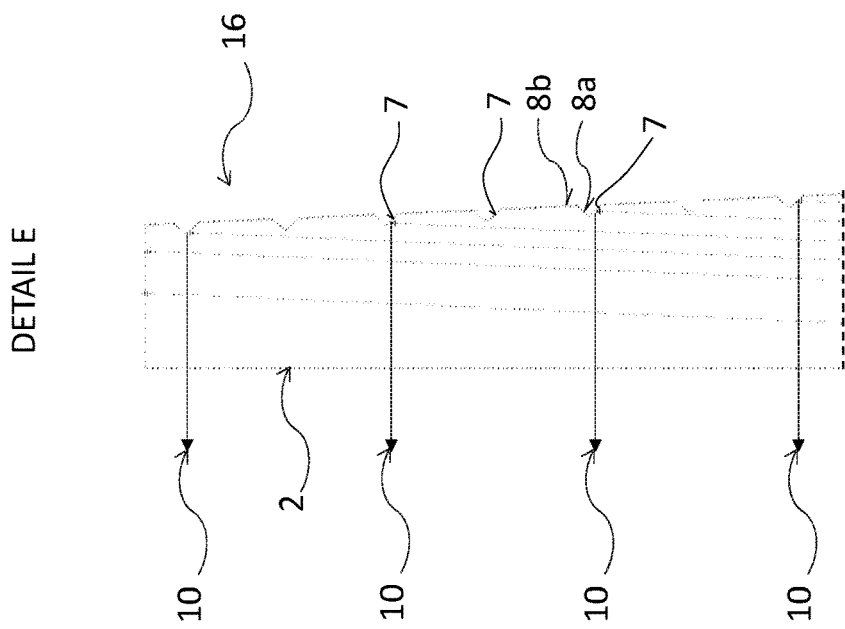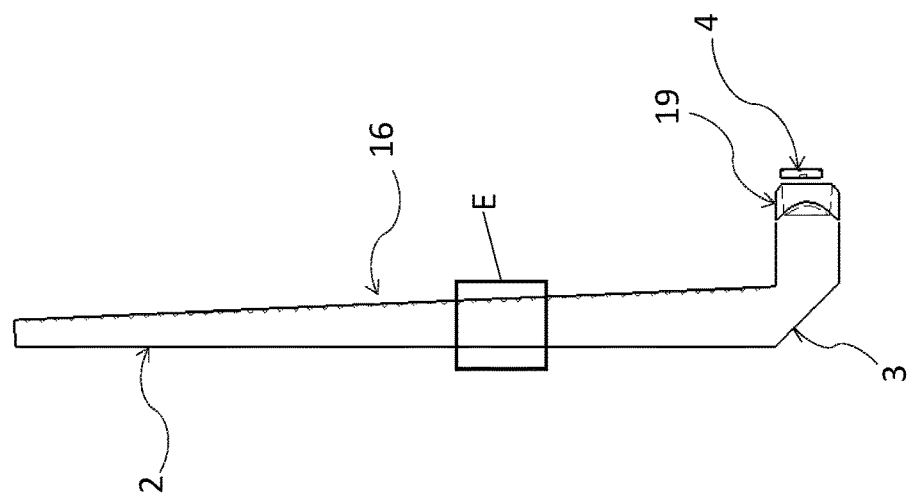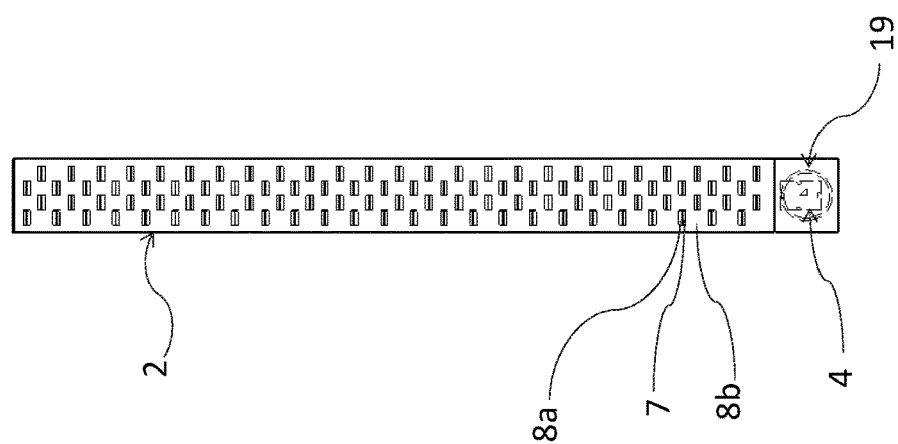

LIGHT-GUIDING OPTICAL UNIT FOR A LIGHT DEVICE OF MOTOR VEHICLES

CROSS-REFERENCE TO RELATED APPLICATIONS

This non-provisional patent application claims the priority benefit of Czech Patent Application No. PV 2020-178 entitled "A light-guiding optical unit for a light device of motor vehicles," filed Mar. 30, 2020, the entire disclosure of which is incorporated herein by reference.

FIELD OF THE INVENTION

The invention relates to a light-guiding optical unit for a light device of motor vehicles comprising a light guide of a plate-like or rod-like shape to guide light emitted by the light source.

BACKGROUND INFORMATION

A common disadvantage of known light guides used for light devices of motor vehicles is the fact that light propagates through the light guide material in an uncontrolled way, which renders efficient unbinding of light in the required direction and achievement of a higher degree of light collimation and amplification of maximum intensities impossible.

Thus, in the field of designing light guides and light guiding systems, there is a continuing effort to propose such solutions that will bring a higher rate of control of the light output in the sense of amplifying intensities in a required direction while maintaining homogeneity of the output light beam. Lower maximum output intensities entail higher requirements for the number of light sources, especially LED's. This brings not only higher financial costs, but also higher requirements for the electronic equipment of the light device, and thus increased production costs of the light device.

A high quantity of light sources can be eliminated through a modification of the design of the optical concept. E.g. the documents WO2018189086A1, CZ307985B6, CZ307329B6 describe light-guiding optical systems that strive to efficiently use the light emitted by the light sources by means of a light-guiding body made of an optically transparent material. The light-guiding body of a planar shape comprises an associated collimating element that is used to efficiently direct light during binding of light rays from the light source already. Collimated light rays are then sent to the reflective surfaces of the light-guiding body, which are frequently designed as planar and inclined by 45° with respect to the light ray direction, for total reflection of at least a part of incident light rays wherein at least a part of light rays reflected this way is directed further to the inner structure of the light-guiding body. A part of light rays is, by means of a prismatic structure, unbound from the light guide to the required direction, generally in the optical axis direction. A disadvantage of these light-guiding systems is the fact that on a total reflection, a part of the light rays is lost or sent in an undesired direction. Another disadvantage of these systems is that high light efficiency and a uniform distribution of light intensity on the output surface cannot be achieved at the same time.

E.g., the document US20020071267A1 describes a solution where the optical system is equipped with a planarly shaped light-guiding body that comprises a primary optical element that light rays enter the inner structure of the light-guiding body through wherein the light rays are collimated into the region of the prismatic structure to avoid total reflections in the inner structure. A tooth-like prismatic structure is used to route light rays in the required direction. A disadvantage of this solution is that the primary optical element only lights up the collimating and prismatic structure in a narrow region. For a uniform distribution of light intensity on a larger output surface, a relatively high number of light sources situated close to each other must be used.

The document U.S. Pat. No. 7,160,010B1 discloses a solution where the optical system is equipped with a planarly shaped light-guiding body and that comprises a primary optical element including a lens for collimating the light rays in one direction, and in the other direction, the propagation of light rays has a radial character. The primary optical element has an indirect character where light rays are routed from the straight direction into a lateral direction. A disadvantage of this solution is that the efficiency of the system uses the axial symmetry of the emission characteristic of the source, and especially the primary optical system is designed with respect to this. The system gains maximum efficiency for functions of an axially symmetrical shape, and with the decreasing degree of symmetry it is proportionally reduced.

Another disadvantage of the prior art is that the unbinding prismatic structure comprises stepwise arranged primary and secondary surface sections. The primary surface sections are situated virtually in parallel to the direction of the collimated light beam. These primary surface sections may be equipped with optical elements to diffuse light rays or to reflect incident light rays. The secondary surface sections are adapted to route incident light rays towards the output surface. Such an arrangement has its limitations from the structural and engineering point of view and the point of view of the optical design of the lighting device. E.g. during the production of the prismatic structure, a non-zero diameter of the production tool causes rounding of the transition in the joint between the primary and secondary section, which consequently has an impact on the size of the effective area of individual surface sections.

The aim of the present invention is to solve the issue of increasing the light efficiency of the light-guiding optical unit without a large number of light sources having to be used to ensure the required light characteristic. Therefore, it is an object of the invention to propose a light-guiding optical unit that makes it possible to fulfil the required light function, including high light efficiency and even distribution of the light intensity on the output surface with the use of a relatively low number of light sources. Another object is to make sure that the light-guiding optical unit is adaptable to requirements resulting from the structural, engineering and optical design of the lighting device.

SUMMARY OF THE INVENTION

The above-mentioned objects of the invention are fulfilled by a light-guiding optical unit for a light device of motor vehicles comprising a light guide that comprises at least one routing surface and at least one light source to generate light rays. The light-guide further comprises a top surface at least a part of which is constituted by the output surface, and a bottom surface opposite the top surface and fitted with a prismatic structure comprising reflective surfaces. The routing surface and the reflective surfaces are mutually arranged in such a way that the routing surface, by means of routing by refraction on this surface or reflection from this surface, directs light rays to the prismatic structure in such a way that it directly lights up only the reflective surfaces with the light rays, the reflective surfaces being configured to direct light rays that have fallen onto them this way directly from the routing surface to the output surface in such a way that the light rays can exit from the light guide through the output surface.

In one of preferred embodiments, the prismatic structure further comprises connecting surfaces wherein in the direction from the routing surface, each connecting surface connects the top end of the preceding reflective surface to the bottom end of the next reflective surface wherein the production radius in the place of connection of the connecting surface to the bottom end is situated in the shade produced by the preceding reflective surface, i.e. no direct light rays fall onto the production radius from the routing surface.

In another one preferred embodiment, in the direction from the routing surface, the top end of each reflective surface is closer to the top surface of the light guide than the bottom end of the next reflective surface, and more distant from the top surface of the light guide than the top end of the said next reflective surface.

In another one preferred embodiment, the reflective surfaces are not broken, and in the direction from the routing surface, they are ascending with respect to the top surface.

In another one preferred embodiment, the reflective surfaces are broken and comprise at least two sections that are ascending with respect to the top surface in the direction from the routing surface.

In another one preferred embodiment, the connecting surfaces are not broken, and in the direction from the routing surface, they are descending with respect to the top surface.

In another one preferred embodiment, the connecting surfaces are broken and comprise at least two sections at least one of which is descending with respect to the top surface in the direction from the routing surface.

In another one of preferred embodiments, the routing surface is configured to produce a parallel or a slightly divergent beam of light rays on a vertical plane. Alternatively, it may be configured to produce a divergent beam of rays on a horizontal plane.

In another one of preferred embodiments, the routing surface is configured to produce a parallel beam of rays on a horizontal plane.

The routing surface may be advantageously part of the light guide surface.

The routing surface may be a binding surface to bind light rays to the light guide at the same time.

In another one of preferred embodiments, the light-guiding optical unit comprises a collimator, which is situated outside the light guide. Alternatively, the collimator may be an integral part of the light guide.

The routing surface or its part may be metal-plated and/or the reflective surfaces may be metal-plated.

In one of preferred embodiments, the light guide has the shape of a curved or planar plate.

In another one of preferred embodiments, the longitudinal axes of the reflective surfaces of the prismatic structure have the shape of arches whose approximate centres of curvature lie in the location of the light guide.

In another one of preferred embodiments, the light guide has a rod-like shape wherein it is straight or curved. The light guide may have a square, rectangular or mushroom-like profile.

CLARIFICATION OF DRAWINGS

Figure 2:
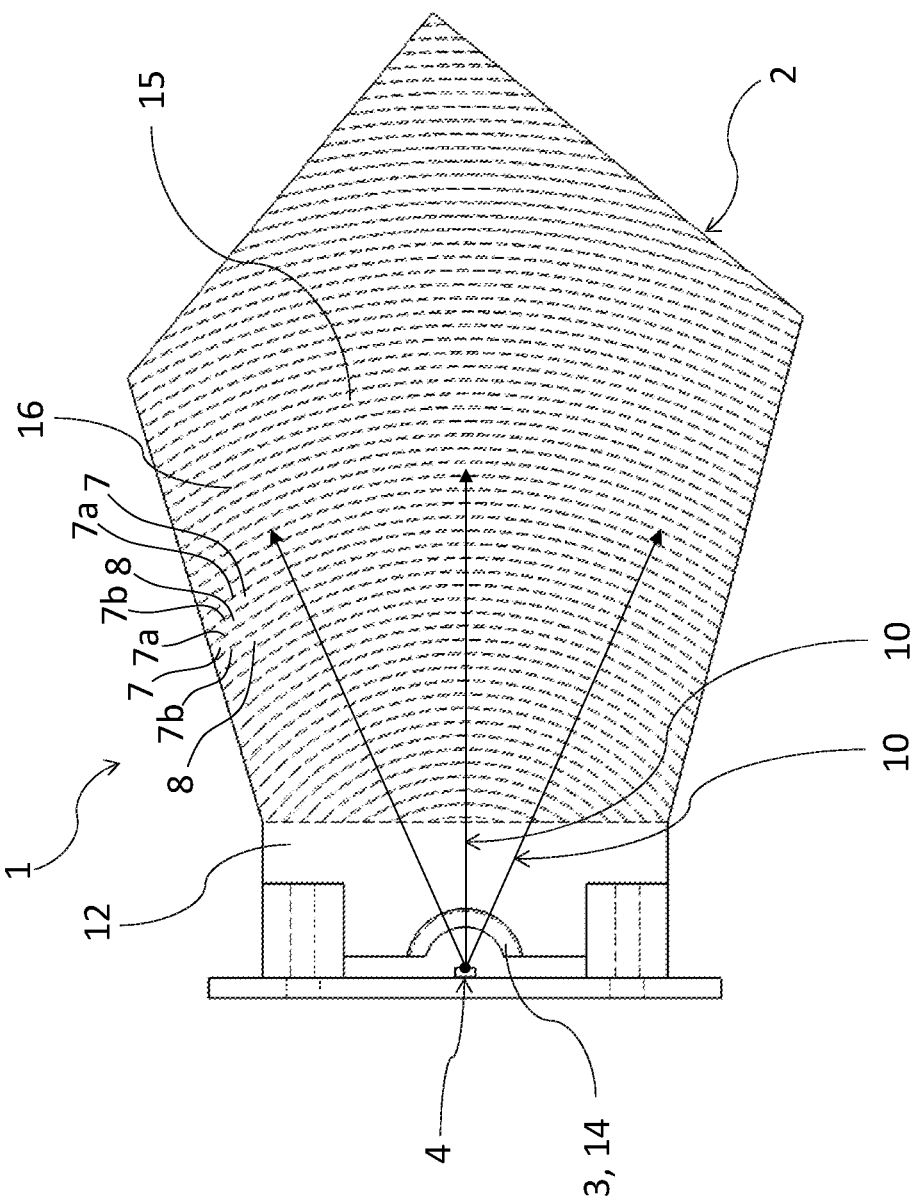
Figure 3A:
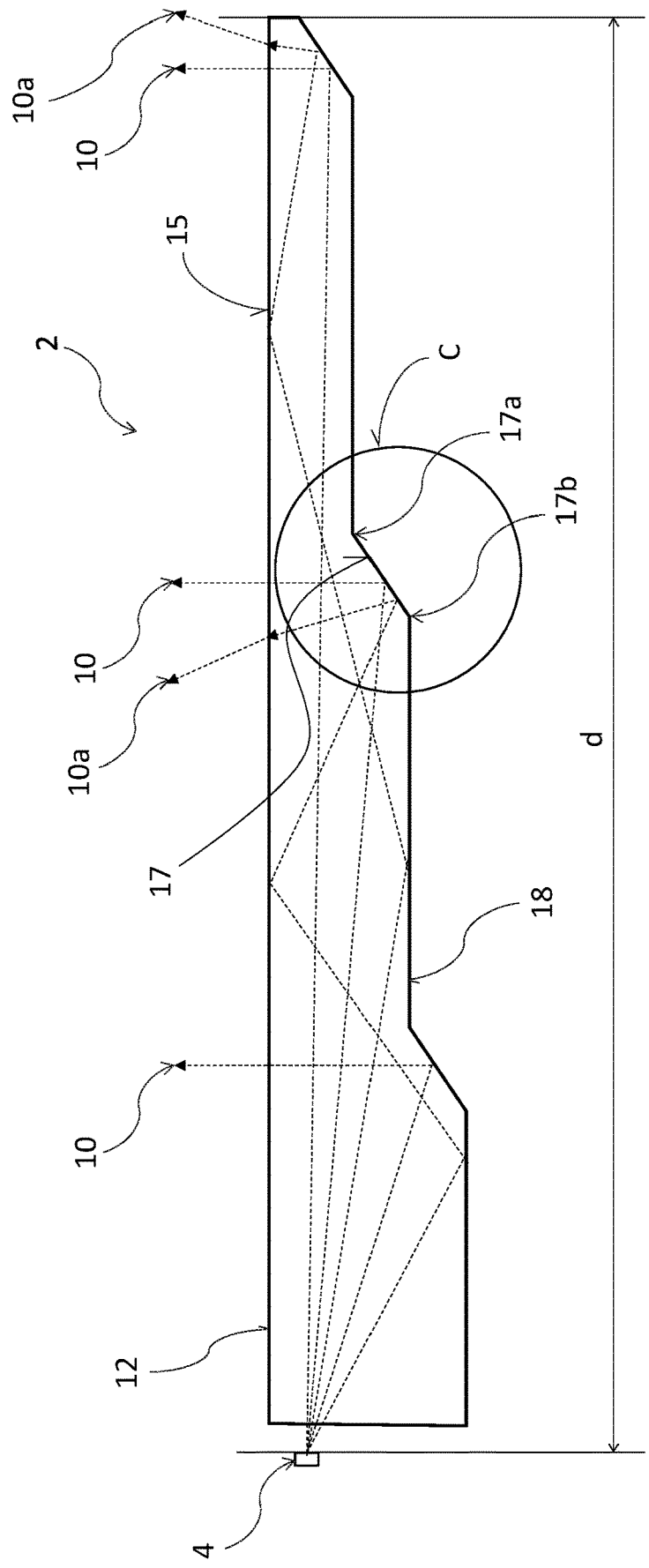
Figure 3B:
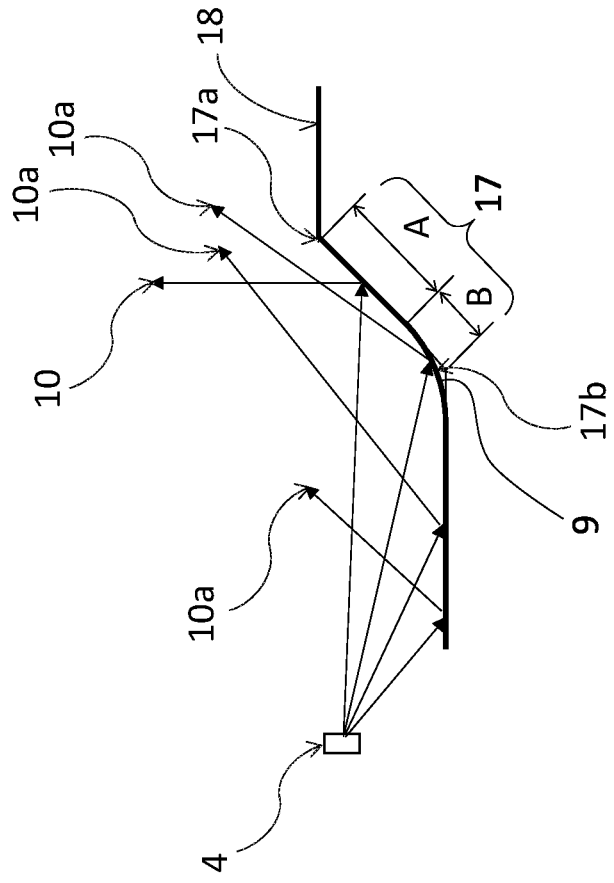
Figure 4A:
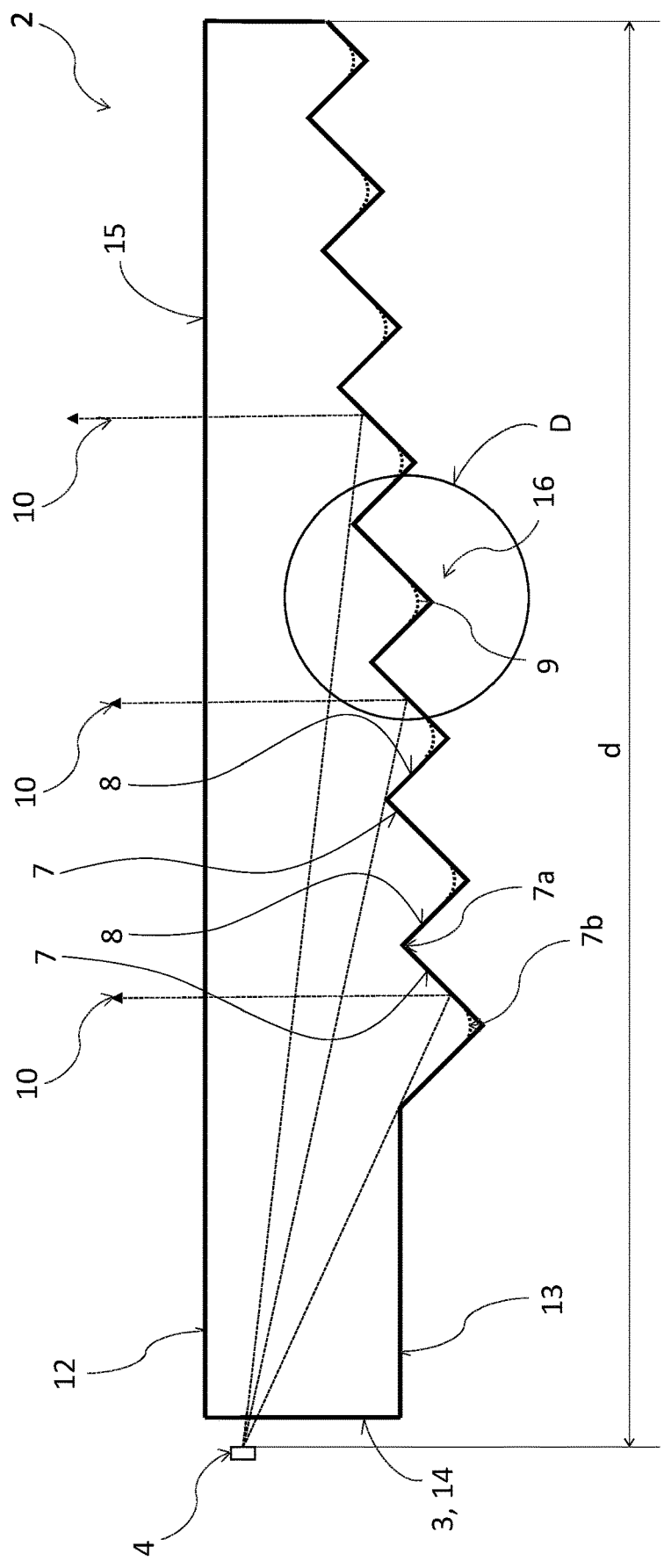
Figure 4B:
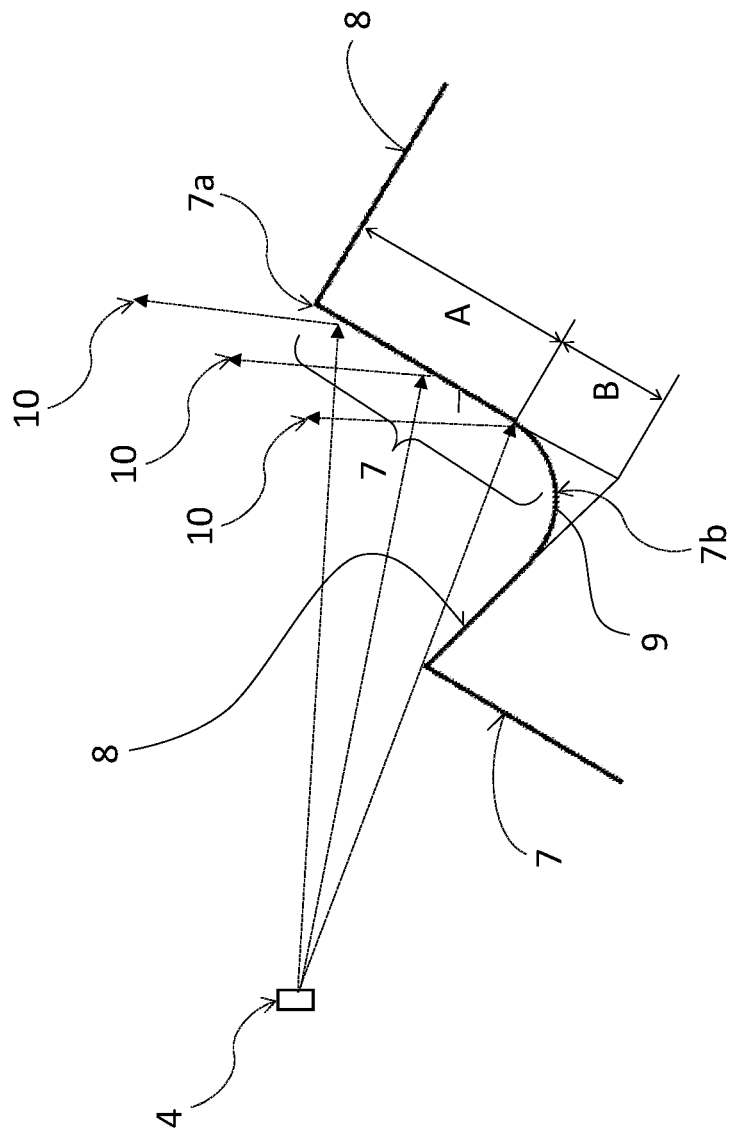
Figure 6:
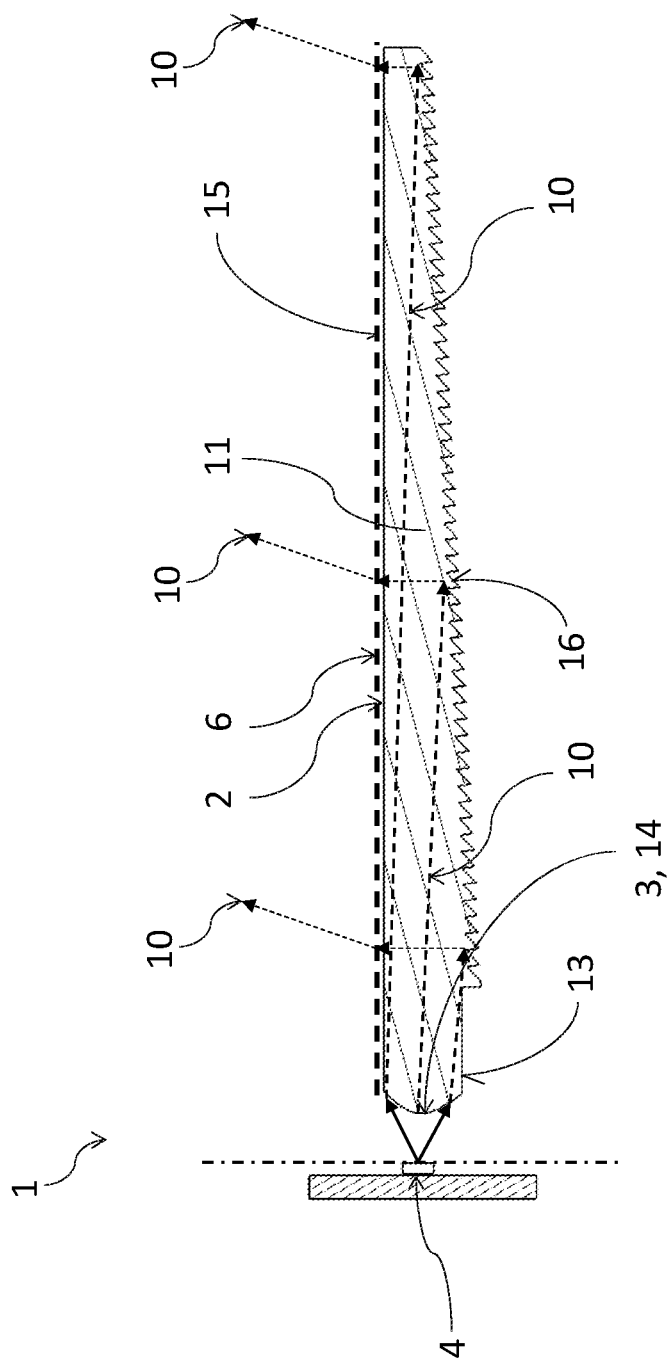
Figure 7:
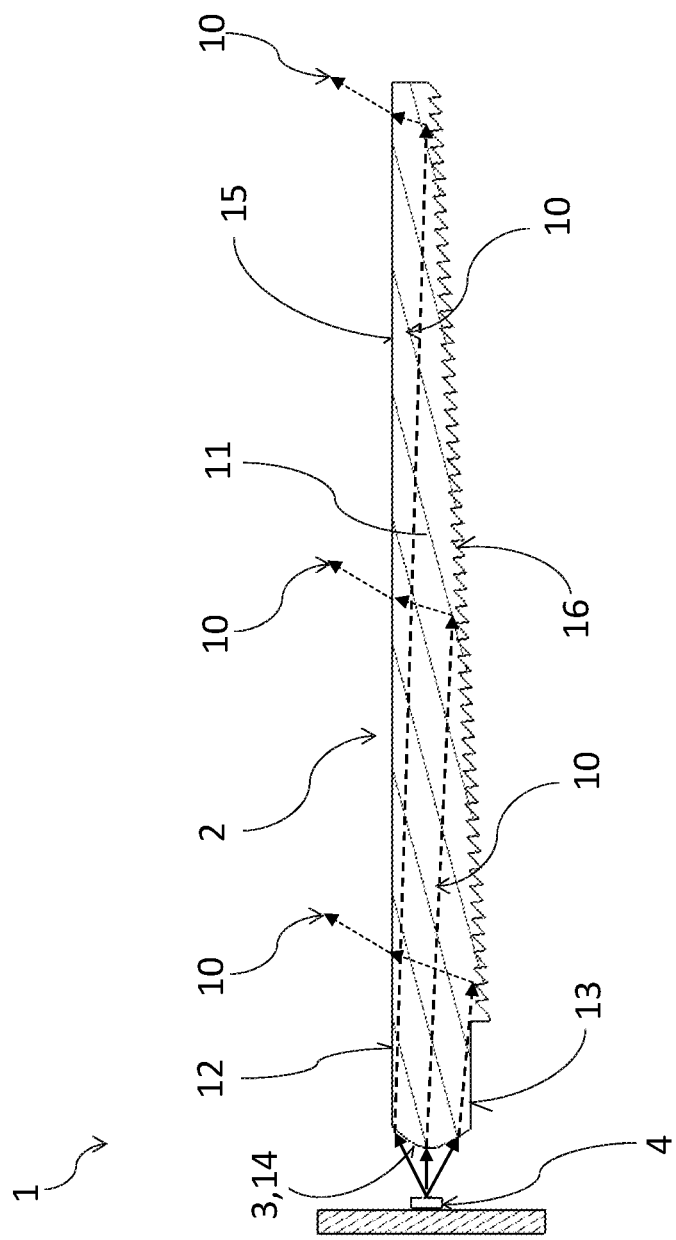
Figure 8:
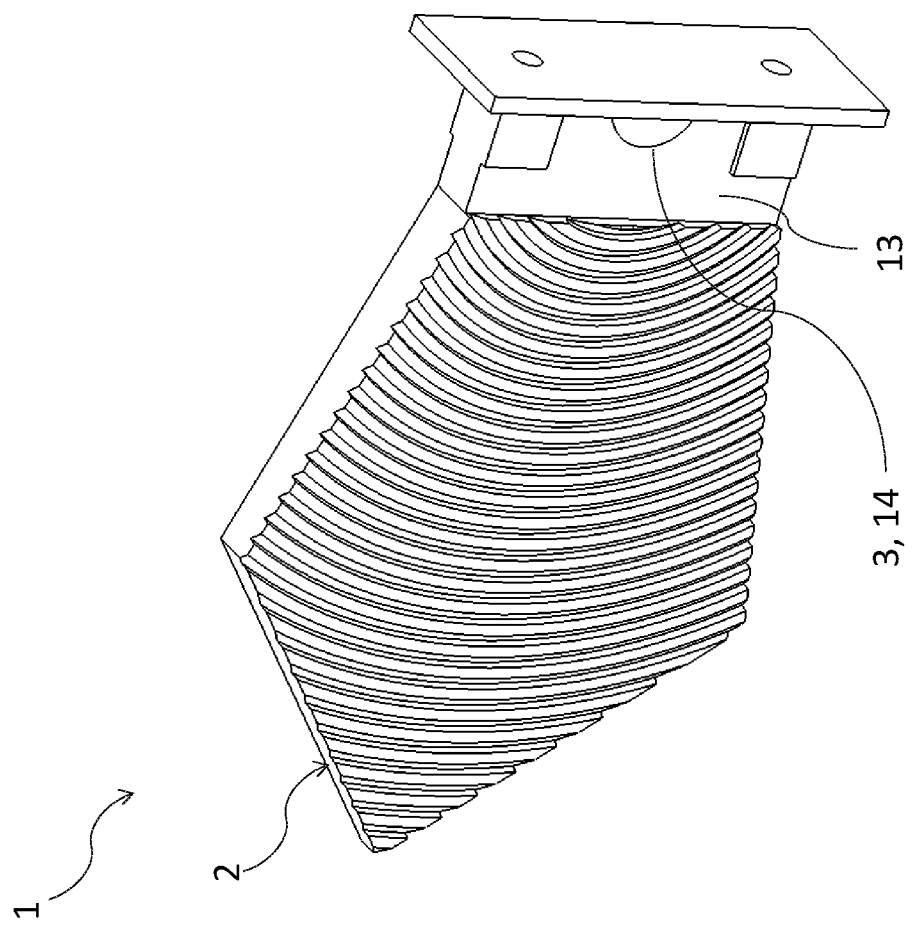
Figure 9:
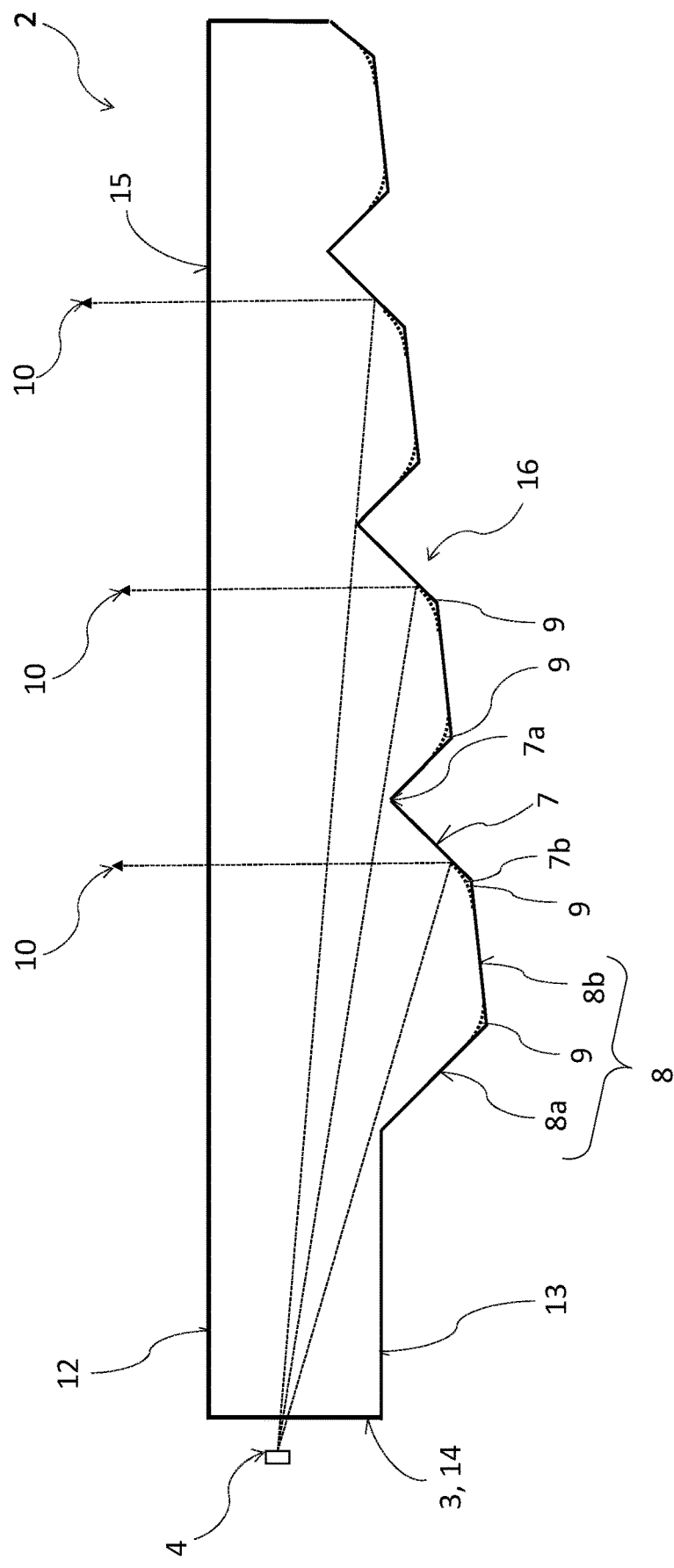
Figure 16:
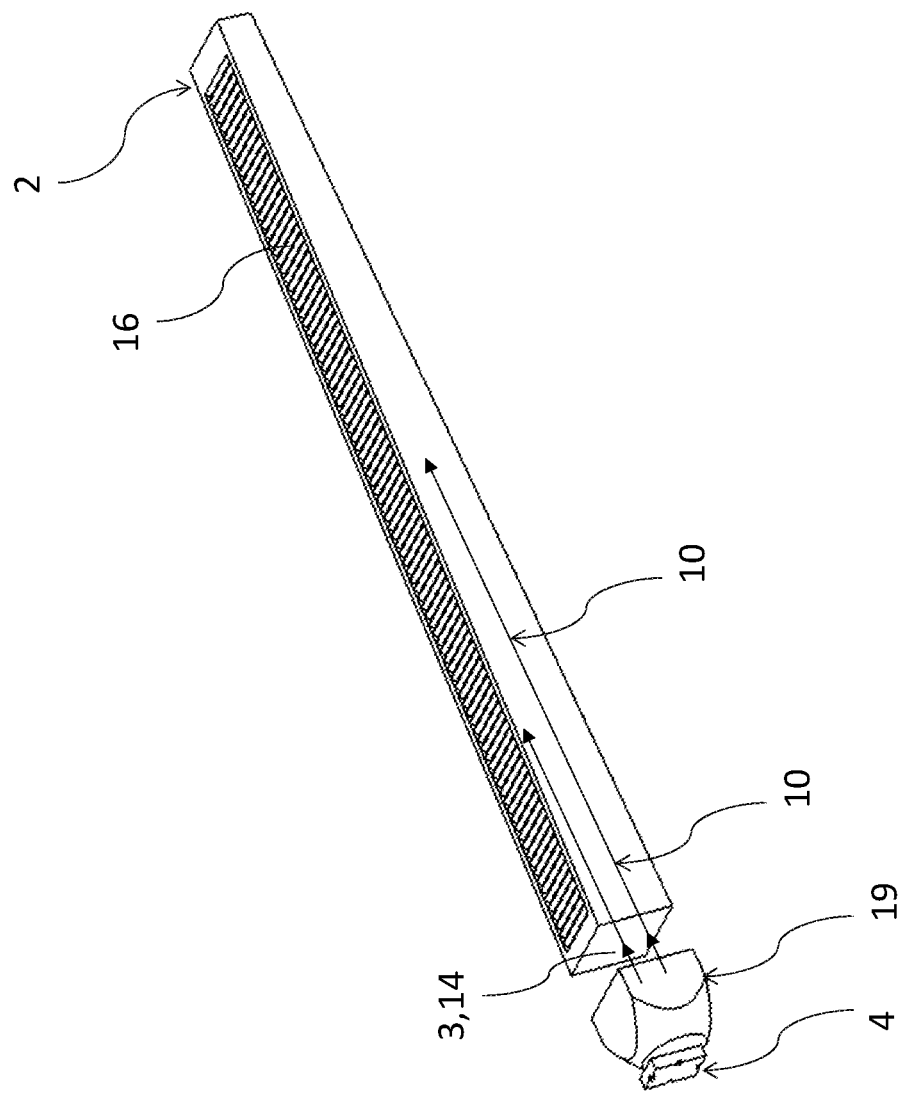
Figure 17:
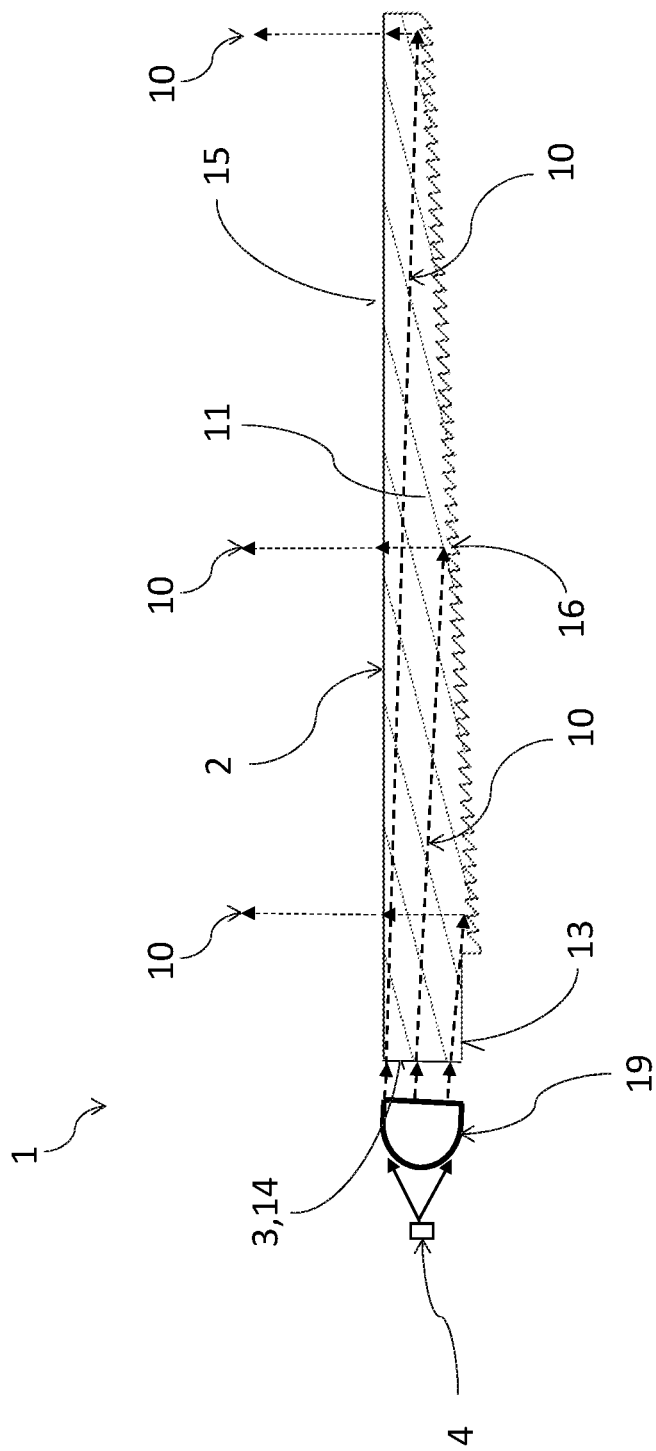
Figure 18:
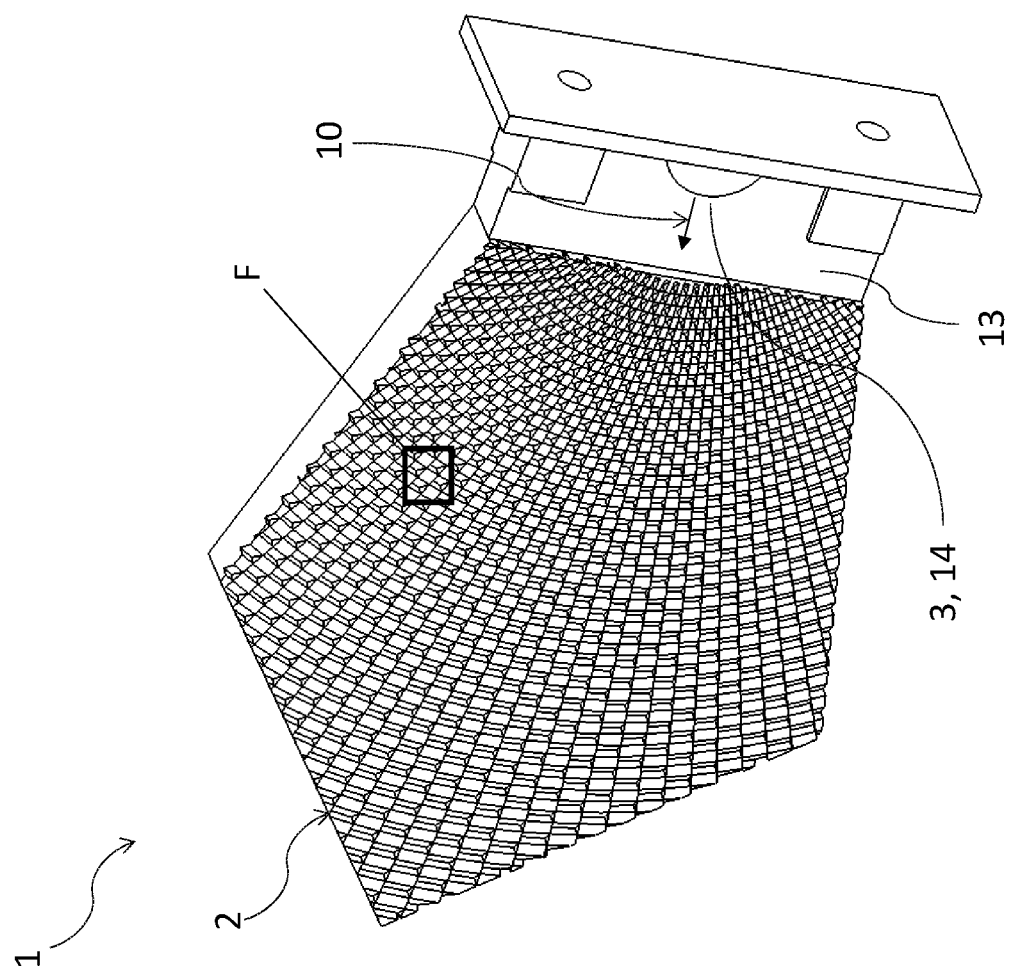
Figure 19B:
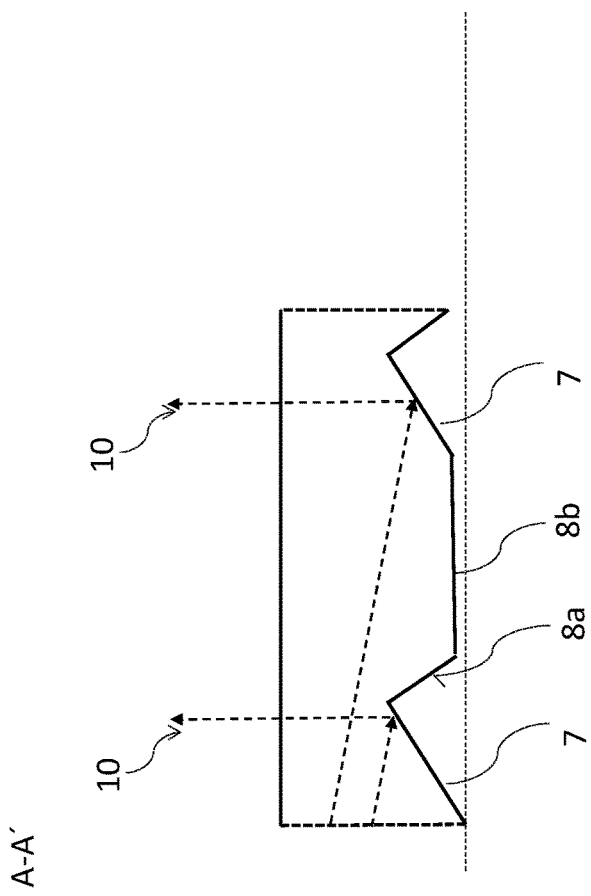
Figure 19A:
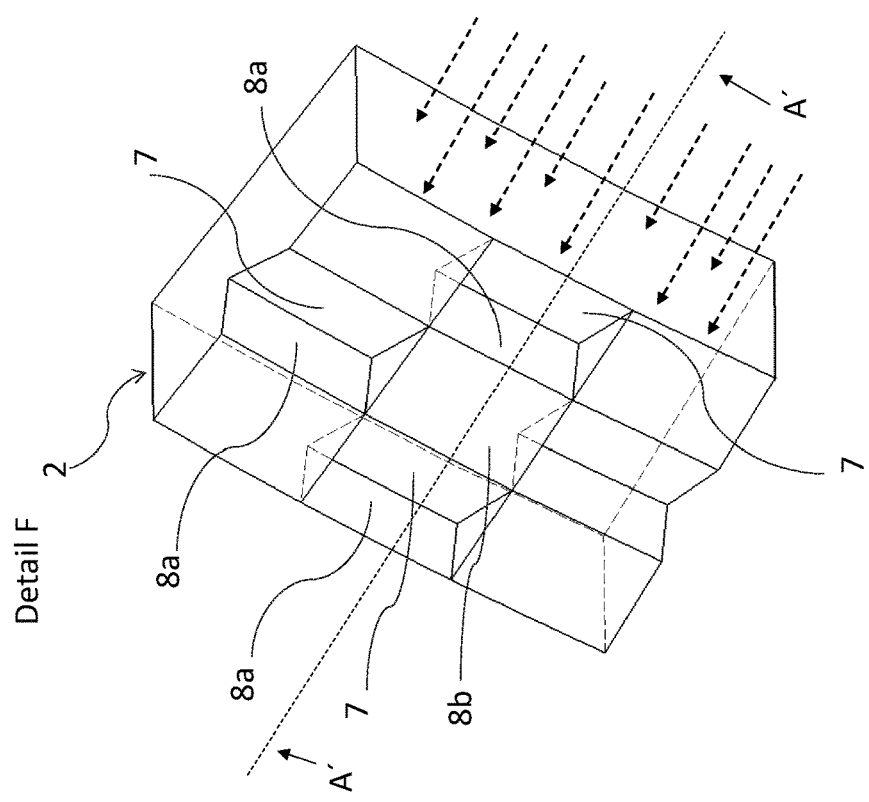
Figure 21:
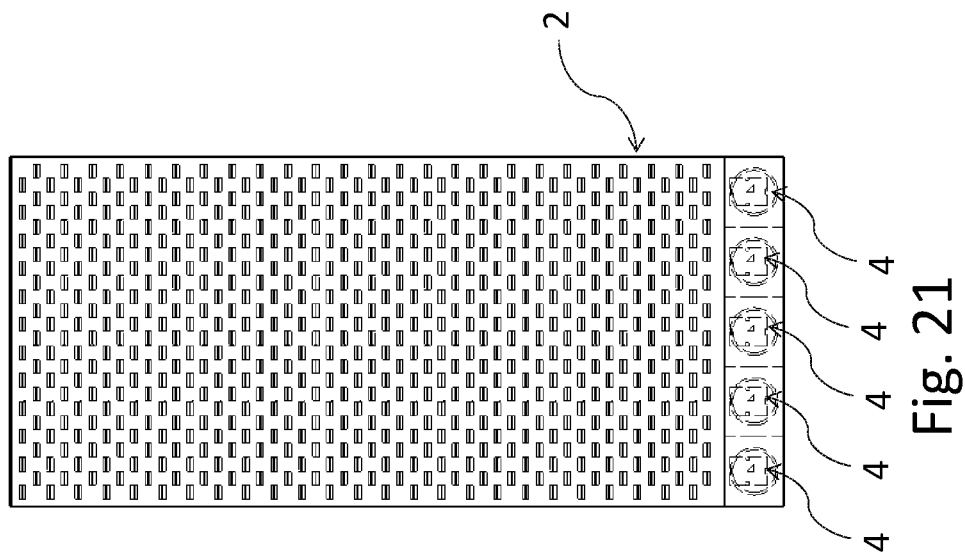
Figure 20:
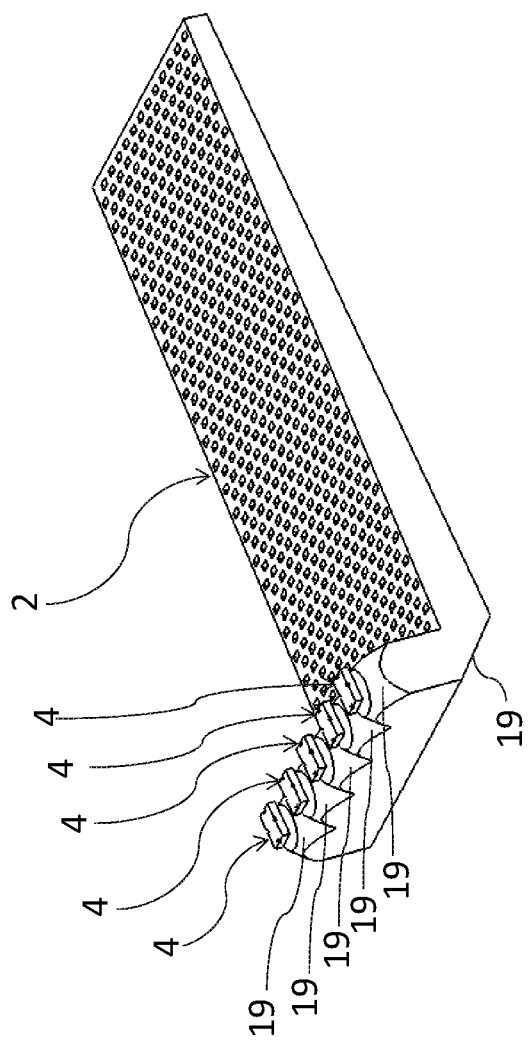
Figure 22:
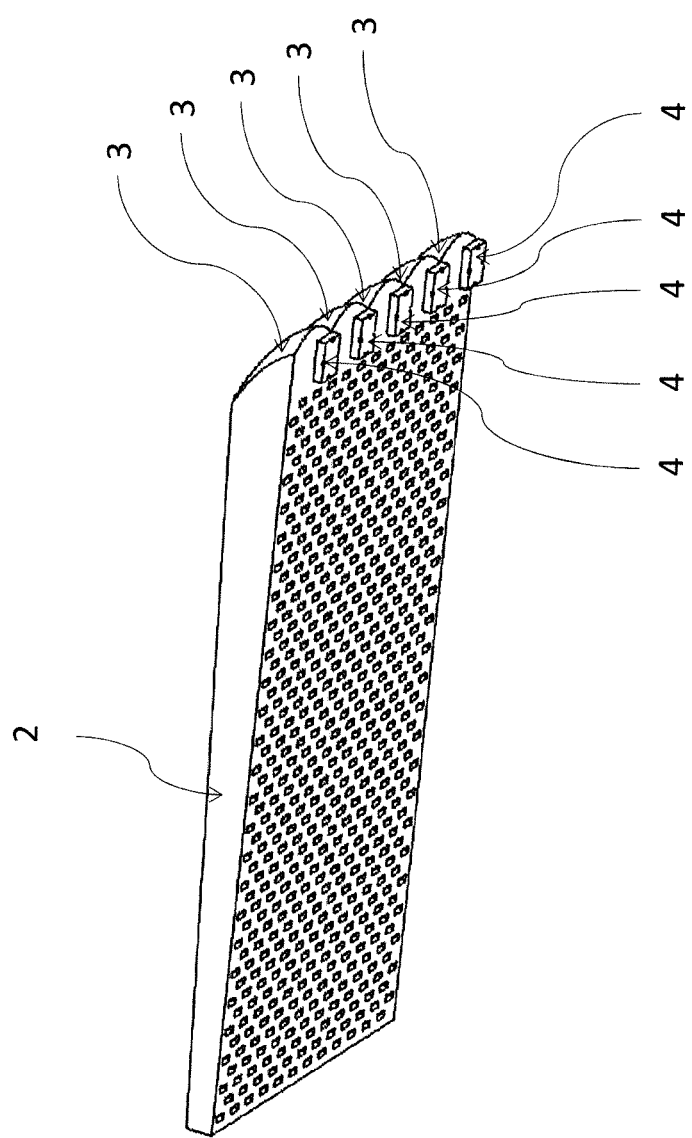
Figure 23:
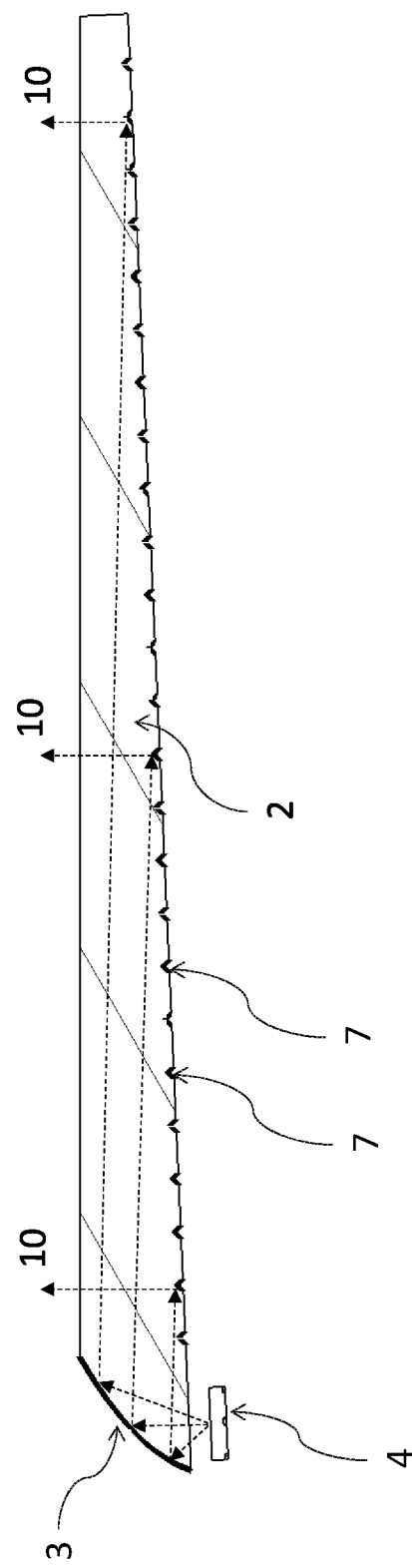
Figure 24:
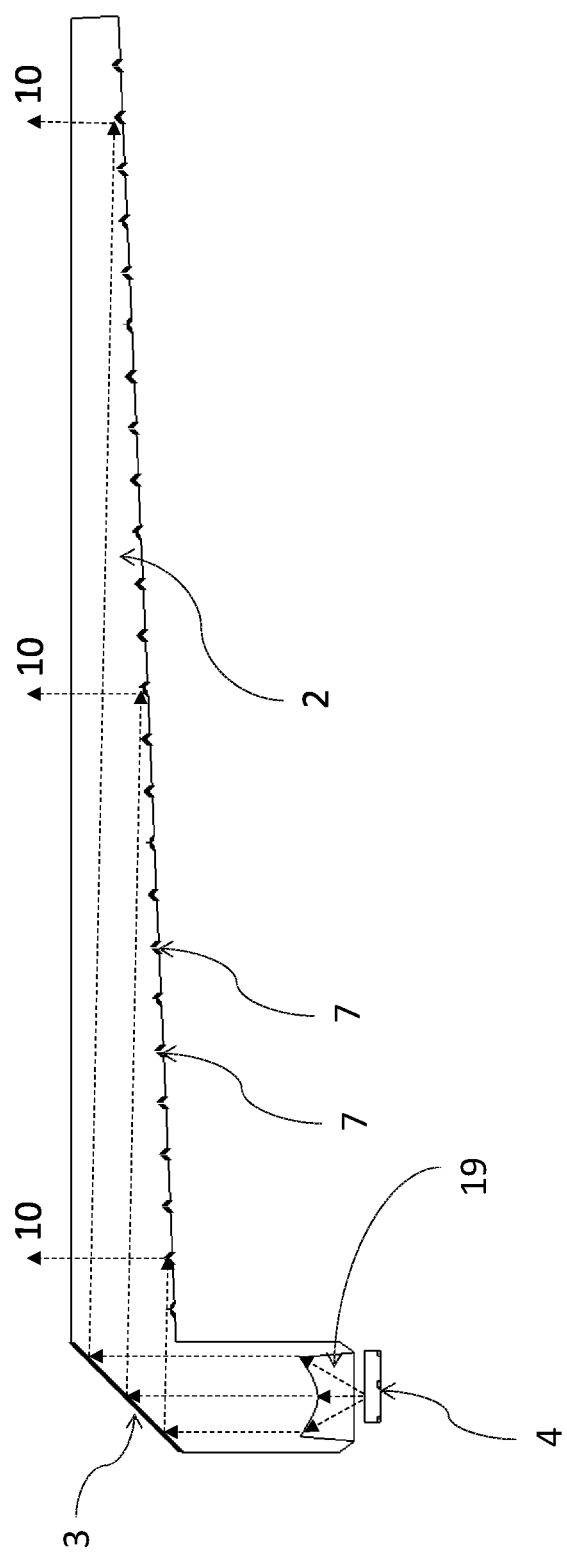

The present invention will be further clarified in more detail with the use of non-limiting embodiment examples of the invention, referring to the enclosed drawings where:

FIG. 1 shows a vertical cross-sectional view of an embodiment example of a light-guiding optical unit according to the invention, FIG. 2 shows a top view of the light-guiding optical unit of FIG. 1, FIG. 3A and FIG. 3B show a prior-art prismatic structure and its detail, FIG. 4A shows an example of a prismatic structure according to the invention used in a light-guiding optical unit according to the invention, FIG. 4B shows a detail of the inventive prismatic structure of FIG. 4A, FIGS. 5 to 7 show a vertical cross-sectional views of more embodiment examples of a light-guiding optical unit according to the invention, FIG. 8 shows an axonometric bottom view of another embodiment example of a light-guiding optical unit according to the invention, FIG. 9 shows a simplified schematic vertical cross-sectional view of a detail of the inventive prismatic structure used in the light-guiding optical unit of FIG. 8, FIGS. 10, 11, 12 show simplified schematic vertical cross-sectional views of details of more examples of a prismatic structure according to the invention, FIG. 13 shows a bottom view of another embodiment example of a light-guiding optical unit according to the invention that contains a light guide of a rod-like shape, also comprising a collimator, FIG. 14 shows a side view of the light-guiding optical unit of FIG. 13, FIG. 15 shows detail E of the prismatic structure of the light-guiding optical unit of FIG. 14, FIG. 16 shows an axonometric view of another embodiment example of a light-guiding optical unit according to the invention that comprises a light guide of a rod-like shape, FIG. 17 shows a simplified vertical cross-sectional view of another embodiment example of a light-guiding optical unit according to the invention that contains a rod-shaped light guide, FIG. 18 shows an axonometric bottom view of another embodiment example of a light-guiding optical unit according to the invention, FIG. 19A shows detail F of the embodiment of the prismatic structure of FIG. 18, FIG. 19B shows section A-A' of the prismatic structure of FIG. 19A, FIG. 20 shows an axonometric bottom view of another embodiment example of a light-guiding optical unit according to the invention, FIG. 21 shows a top view of the light-guiding optical unit of FIG. 20, FIG. 22 shows an axonometric bottom view of another embodiment example of a light-guiding optical unit according to the invention, FIG. 23 shows a vertical cross-sectional view of another embodiment example of a light-guiding optical unit according to the invention, and FIG. 24 shows a vertical cross-sectional view of still another embodiment example of a light-guiding optical unit according to the invention.

EXAMPLES OF EMBODIMENTS OF THE INVENTION

The adjectives "top" and "bottom" in the text of this application relate to the position shown in the attached drawings (except FIG. 2, showing a top view), and these adjectives do not predict or define the actual position of the light guide 2 with respect to the vehicle where the light-guiding optical unit 1 is installed in use. The adjectives "preceding" and "next" express a relative order in the propagation direction of light rays 10 from the routing surface 3 further into the light guide 2. A "vertical plane" refers to the projection plane of the figures (except FIG. 2) and a "horizontal plane" refers to a plane perpendicular to the vertical plane.

FIG. 1 and FIG. 2 show an embodiment example of a light-guiding optical unit 1 according to the present invention. The light-guiding optical unit 1 comprises a light guide 2 and a routing surface 3 of a free form—"free-form" routing surface 3. In this embodiment example, it is a refracting routing surface 3 (generally, it may be a catadioptric optical surface), which may be, as in this embodiment example, a binding surface at the same time. The routing surface 3 is designed to route light rays 10 emitted from the light source 4 to direct and guide the light rays 10 virtually exclusively directly to the reflective surfaces 7 of the prismatic structure 16, so that the reflective surfaces 7 can be directly lit by these light rays 10, as explained in more detail below. The routing surface 3 shown is the surface of a free-form lens. The light guide 2 is of a plate-like shape, so that it approximately has the shape of a plate 11, which may be planar (see the shown embodiment example) wherein the top surface 12 of the light guide 2 is planar, or curved, i.e., with a curved top surface 12 (e.g., convex, concave, corrugated etc.). Thus, the term "plate" 11 is not only restricted to "planar" plates. The top surface 12 and the opposite bottom surface 13 of the light guide 2 are mutually connected with a lateral surface 14. The top surface 12 is at least partly constituted by the output surface 15, through which the light rays 10 leave the light guide 1, and the bottom surface 13 comprises a stepwise arranged prismatic structure 16 to route light rays 10 in the desired direction.

The routing surface 3 generally refers to a surface, either a refracting (causing refraction) or a reflecting one, from which light rays 10 that fall onto it or are refracted on it, are routed directly to the reflective surfaces 7. Routing "directly" means that the optical path of a light ray 10 between the routing surface 3 and the reflective surface 7 is direct, i.e., no re-routing of light rays 10 occurs on it (e.g., re-routing by total reflection from the output surface 15). The routing surface 3 is configured so as to send a beam of parallel or slightly divergent rays 10 to the reflective surfaces 7 on a vertical plane. On a horizontal plane, the routing surface 3 may then send a beam of divergent light rays 10 (see FIG. 2), which is especially convenient with a planarly shaped light guide 2, or a beam of parallel light rays 10, which is especially practical with light guides of a rod-like shape (see FIG. 16). In the latter case, where from a routing surface 3 or surfaces 3, a beam of parallel rays 10 is directed, it is especially convenient to use a collimator 19. The collimator 19 may be situated at a distance from the routing surface 3 (see FIGS. 14, 16, 20) wherein it may be part of the light guide 2 (see FIGS. 14, 20), or it may be situated at a distance from the light guide 2 (see FIG. 16).

FIG. 2 shows a top view of the light-guiding optical unit 1. In this embodiment example, individual reflecting surfaces 7 and connecting surfaces 8 of the prismatic structure 16 are situated with their longitudinal axes on parts of circular arches, but differently shaped positioning is generally possible. The centres of the circular arches advantageously lie in the location of the light source 4. Though in the embodiment example of a light-guiding optical unit 1 shown in FIGS. 1 and 2, the light-guiding optical unit 1 only comprises one light source 4, the invention envisages embodiments where more light sources and routing surfaces that route light rays emitted from the light sources to the light guide are associated with the light guide.

FIG. 3A shows a vertical cross-sectional view of a prior-art prismatic structure, its detail C being shown in FIG. 3B. The prismatic structure of the light guide 2 comprises the first reflective surfaces 17 and the second reflective surfaces 18, which are parallel to the output surface 15 and connect each two adjacent first reflective surfaces 17. The first reflective surfaces 17 have top ends 17a and bottom ends 17b. Detail C indicates that the first reflective surface 17 comprises region A from which light rays 10 from the light source 4 are reflected in the desired direction in such a way that these light rays 10 leave the light guide through its output surface 15. However, light rays also fall on region B at the bottom end 17b of the first reflective surface 17, which is defined by the production radius 9 region, and they are reflected from it in the form of deflected light rays 10a that propagate in undesired directions. They are undesired because these directions significantly differ from the directions of light rays 10 reflected from the first reflective surfaces 7, which disturbs homogeneity, directional unity and reduces the overall light efficiency of the light guide. The production radius 9 is inevitably formed during the production of the light guide as the production tool does not absolutely have any sharp edges, but in practice it comprises a rounding. Further, a part of light rays falls onto the second reflective surface 18, from which is also reflected in the form of deflected light rays 10a that also propagate in undesired directions. They are undesired both for the above-mentioned reasons, and also because with respect to the incidence angle of these deflected rays 10a, their part does not leave the light guide through its output surface 15, but the deflected light rays 10a get totally reflected on it and propagate further along the light guide. Thus, from the point of view of the invention, the deflected light rays 10a are generally undesired from the viewpoint of homogeneity, light efficiency of the light guide and intensity of the output beam leaving the output surface 15, because they affect the physical characteristics or quantities of the output beam.

Now, the said prior art described in association with FIG. 3A will be compared to an example of a solution of the prismatic structure 16 according to the invention shown in FIG. 4A, and with detail C of this prismatic structure 16 shown in FIG. 4B. As indicated, region B comprising the production radius 9 is situated in a shade produced by the top end 7a of the preceding reflective surface 7, so that light rays 10 fall onto the next reflective surface 7 directly from the routing surface (not shown in FIG. 3B for simplification) in region A only, which is a reflective region from which light rays 10 are reflected in the desired direction towards the output surface 15 at an angle that will enable exit of light rays 10 from the light guide through the output surface 15, so there are no disturbing reflections of light rays 10 from the production radius 9. In addition, the prismatic structure 16 is arranged in such a way that light rays can be directed from the routing surface 3 exclusively directly onto the reflective surface 7, which are not broken in this embodiment example (in their profile they are shown as a non-broken curve), which means that all reflected light rays 10 propagate virtually in the same direction towards the output surface 15. This way, maximum efficiency of the output of light rays 10 from the light guide 2 is ensured, namely in one direction. Thus, it represents a considerable improvement as compared to the described prior art. In the inventive solution, the unbinding optical system resulting from the prismatic structure 16 is calculated in such a way that region B is not directly lit up, so the light is unbound by region A, which is not affected by the production radius 9, which enables achievement of controlled light output. It should be noted that the top ends 7a and the bottom ends 7b are lines (see FIG. 2), which appear as points in the vertical cross-sectional views in the figures.

To demonstrate another advantage of the invention compared to the prior art, FIGS. 3A and 4A both indicate an equally long section given by the distance d from the light source 4. The comparison of both the solutions clearly indicates that more unbinding elements—reflective surfaces 7 can be positioned along the same distance d in the inventive solution. If the same number of unbinding surfaces—i.e. the first reflective surfaces 17 (FIG. 3A) were to be positioned along the distance d according to the prior art as the number of reflective surfaces 7 along this distance d according to the invention (FIG. 4A), the size of the first reflective surfaces 17 would have to be proportionally reduced, which would emphasize the influence of the production radii 9, or the light guide 2 would have to be significantly wider at the input to achieve the same distance d.

The inventive prismatic structure 16 generally comprises reflecting surfaces 7 and connecting surfaces 8. According to this invention, a reflective surface is defined as a broken or non-broken surface (i.e. a surface shown in vertical cross-sectional views as a broken or non-broken surface) to which or at least to a part of which light rays 10 are directly routed from the routing surface 3 wherein in the propagation direction of light rays 10 from the routing surface 3, the reflective surface 7 is always inclined towards the output surface 15, therefore being referred to as an "ascending surface" in a simplified manner. Examples of a non-broken reflective surface 7 are the reflective surfaces 7 of FIGS. 4A, 9, 11, 12, and examples of a broken reflective surface 7 are reflective surfaces 7 of FIG. 10, comprising the sections 7c and 7d. The connecting surface 8 according to the invention is either non-broken, in which case it is descending, or broken. If it is broken, it always comprises the first section 8a, which runs from the top end of the preceding reflective surface 7 and which is descending, and the second section 8b, which may be descending, parallel (to the output surface 15) or ascending. Light rays 10 from the routing surface 3 are not directed to the connecting surface 8, i.e. the connecting surface 8 or its part is not intended to reflect light rays 10, but only to connect two adjacent reflective surfaces 7. Examples of a non-broken connecting surface 8 are the connecting surfaces 8 of FIGS. 4A, 10, and examples of a broken connecting surface 8 are the connecting surfaces 8 of FIGS. 9, 11, 12, comprising the sections 8a and 8b.

What appears to be convenient from the point of view of general light efficiency of the light guide 2 is that the routing surfaces 3 of the reflective type and/or reflective surfaces 7 of the prismatic structure 16 are metal-plated, namely especially in cases when the incidence angles on these surfaces approximate critical angles with respect to the material selection of the light guide 2. It is true, that inevitable losses occur on reflection from metal-plated surfaces, but because at angles close to the critical angle, the total reflection efficiency is reduced, the said metal-plating may lead to an increase of the overall optical efficiency of the light guide 2 compared to a version without metal-plating. Examples of solutions with metal-plating are shown in FIG. 23 and FIG. 24.

Now, let us return to the description of individual preferred embodiments. FIGS. 5 to 7 show more embodiment examples of a light-guiding optical unit 1 according to the invention that use a prismatic structure 16 of a similar arrangement as the arrangement of FIGS. 4A, 4B.

FIG. 5 shows a vertical cross-sectional view of another embodiment of a light-guiding optical unit 1 according to the present invention that comprises a reflective surface 5 that is situated against the bottom surface 13 of the light guide 2 in the region of the prismatic structure 16 and is adapted to reflect or diffuse light rays 10 that have escaped from the light guide 2 through the prismatic structure 16.

FIG. 6 shows another embodiment example of a light-guiding optical unit 1 according to the present invention that comprises a light filter 6 that is situated at the output surface 15 and is adapted to route/deflect light rays 10 to the desired direction. Alternatively or additionally to the said adaptation for routing, the light filter 6 may also be configured to diffuse light rays 10.

FIG. 7 shows another embodiment example of a light-guiding optical unit 1 according to the present invention wherein the prismatic structure 16 is adapted to send light rays in a direction deflected from the direction perpendicular to the output surface 15, similarly to the preceding embodiment example, which is however achieved unlike the solution of FIG. 6 by the entire geometrical configuration of the prismatic structure 16 and subsequent refraction of light rays 10 on the output surface 15.

FIGS. 8 and 9 show another embodiment example of a light-guiding optical unit 1 and a prismatic structure 16 used in it according to the invention. The prismatic structure 16 comprises non-broken (smooth) reflective surfaces 7 and broken connecting surfaces 8 that consist of sections 8a, 8b. Thus, the prismatic structure is configured in such a way that light rays 10 are only directed from the routing surface 3 directly onto the reflective surfaces 7 in such a way that they do not fall onto the production radii 9 created between the sections 8a and 8b of the connecting surface 8 and between the section 8a and the reflective surface 7. Thus, both these production radii 9 are situated in a shade produced by the preceding reflective surface 7. The section 8a of the connecting surface 8 is descending and the section 8b is ascending.

Figure 10:
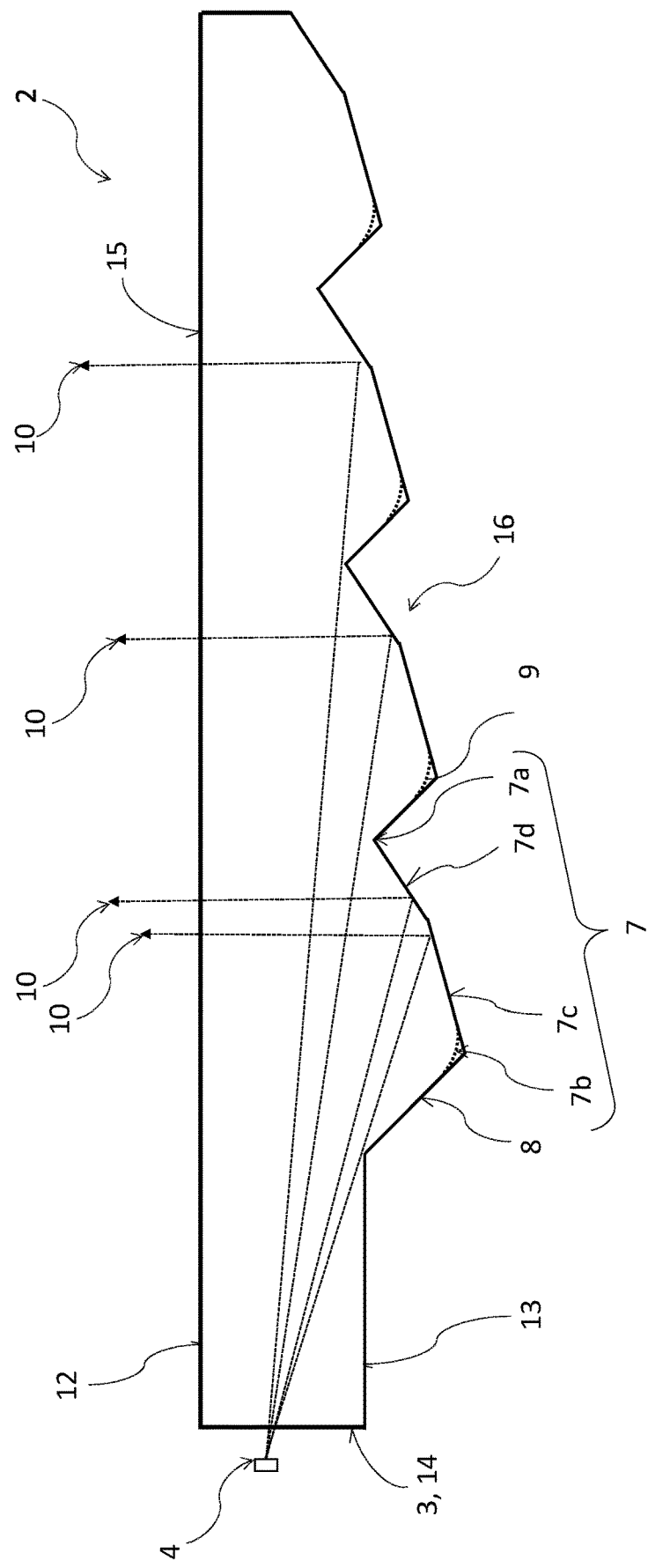

FIG. 10 shows another embodiment example of the prismatic structure 16 according to the invention. The prismatic structure 16 comprises broken reflective surfaces 7 comprising sections 7c and 7d and non-broken (smooth) connecting surfaces 8. Thus, the prismatic structure 16 is configured in such a way that light rays 10 are directly routed from the routing surface 3 onto the sections 7c, 7d of the reflective surface 7 so that they do not fall onto the production radius 9 created between the connecting surface 8 and the section 7c of the reflective surface 7, and so this production radius 9 is situated in a shade produced by the preceding reflective surface 7. The sections 7c and 7d make an angle that approximates the direct angle, so the disturbing effect of the connection of both the sections 7c and 7c is negligible in the case of incidence of light rays 10 onto this connection. Light rays 10 are reflected from both the sections 7c, 7d in almost the same direction and they fall onto the output surface 15 at a lower incidence angle than the critical angle, which makes exit of these rays 10 from the light guide 2 through the output surface 15 possible. As mentioned above, the reflective surfaces 7 are ascending according to the invention, i.e. the sections 7c, 7d of the reflective surface 7 are also ascending.

Figure 11:
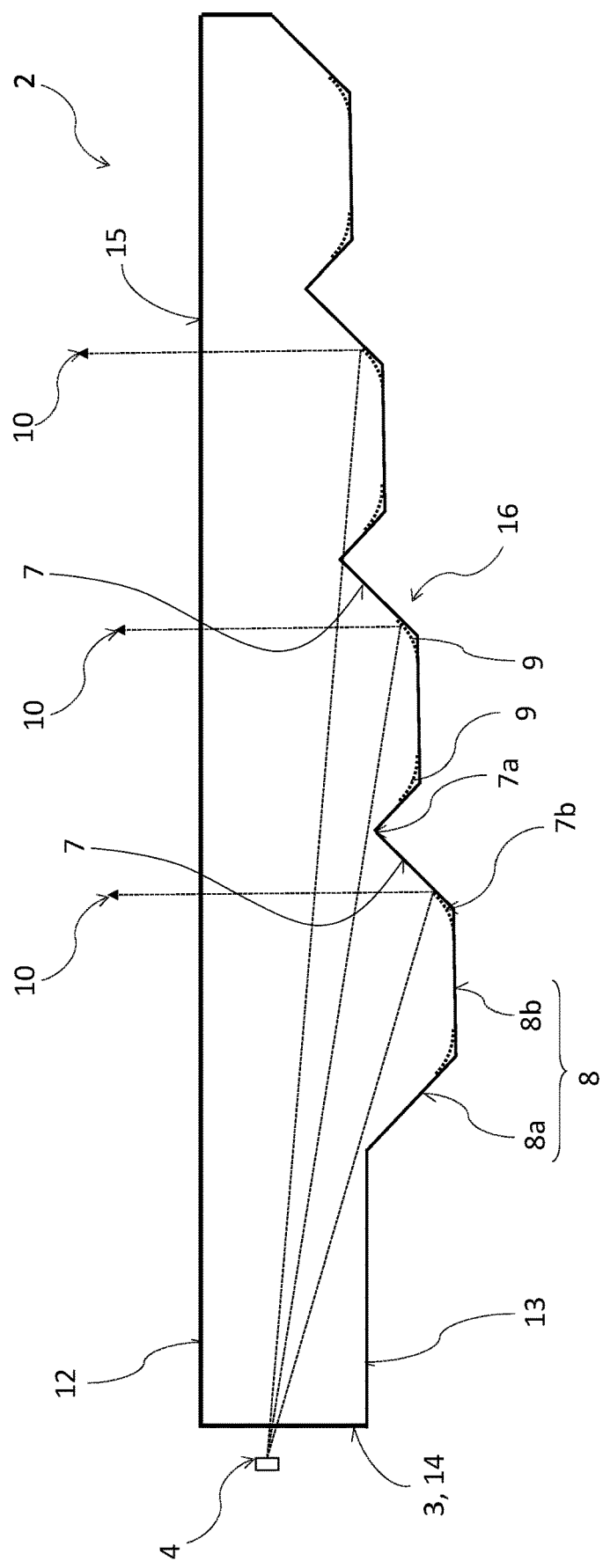

FIG. 11 shows another embodiment example of the prismatic structure 16 according to the invention. The prismatic structure comprises non-broken (smooth) reflective surfaces 7 and broken connecting surfaces 8 that consist of sections 8a, 8b. Thus, the prismatic structure is configured in such a way that light rays 10 are only directed from the routing surface 3 directly onto the reflective surfaces 7 in such a way that they do not fall onto the production radii 9 created between the sections 8a and 8b of the connecting surface 8 and between the section 8a and the reflective surface 7. Thus, both these production radii 9 are situated in a shade produced by the preceding reflective surface 7. The section 8a of the connecting surface 8 is descending and the section 8b is parallel to the output surface 15.

Figure 12:
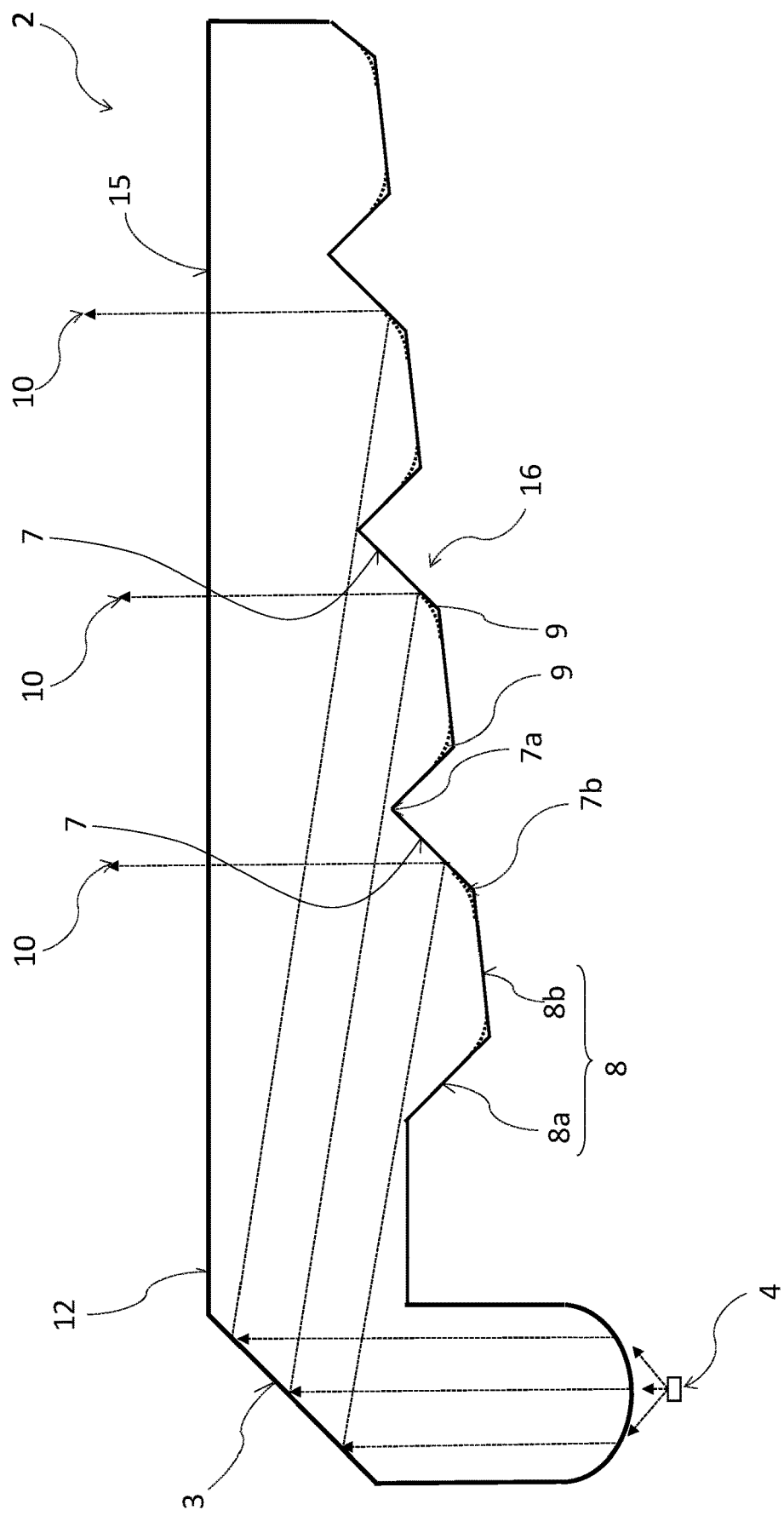

FIG. 12 sows in a simplified a schematic manner another embodiment example of a light-guiding optical unit 1 and a prismatic structure 16 used in it according to the invention. The prismatic structure 16 comprises non-broken (smooth) reflective surfaces 7 and broken connecting surfaces 8 that consist of sections 8a, 8b. Thus, the prismatic structure is configured in such a way that light rays 10 are only directed from the routing surface 3 directly onto the reflective surfaces 7 in such a way that they do not fall onto the production radii 9 created between the sections 8a and 8b of the connecting surface 8 and between the section 8a and the reflective surface 7. Thus, both these production radii 9 are situated in a shade produced by the preceding reflective surface 7. The section 8a of the connecting surface 8 is descending and the section 8b is ascending. The light guide 2 surface comprises a routing surface 3. The routing surface 3 directly routes light rays 10 onto the reflective surfaces 7, from which the light rays 10 are reflected to the output surface 15 and through which they leave the light guide 2.

FIGS. 13, 14 and 15 schematically show another embodiment example of a light-guiding optical unit 1 and a prismatic structure 16 used in it according to the invention. The light guide 2, which is fitted with a prismatic structure 16, is of a rod-like shape. The prismatic structure 16 comprises several adjacent rows each of which comprises in the direction from the routing surface 3, arranged after each other and passing into each other, unbroken (smooth) reflective surfaces 7 and broken connecting surfaces 8 that consist of the sections 8a, 8b. The said rows are preferably situated next to each other in such a way that they are mutually shifted, so the reflective surfaces 7 of one row do not concur with the reflective surfaces 7 of the adjacent row. The prismatic structure 16 is configured in such a way that light rays 10 are only directed from the routing surface 3 directly onto the reflective surfaces 7 in such a way that they do not fall onto the production radii 9 (not emphasized in the figures) created between the sections 8a and 8b of the connecting surface 8 and between the section 8a and the reflective surface 7. The section 8a of the connecting surface 8 is descending and the section 8b is ascending. The light guide 2 comprises a collimator 19 that the light rays 10 emitted by the light source 4 enter. A beam of parallel light rays 10 leaves the collimator 19, the light rays being routed by the routing surface 3 to the reflective surfaces 7, from which the light rays 10 are reflected to the output surface 15 through which the rays 10 exit from the light guide 2.

FIG. 16 and FIG. 17 show more embodiment examples of a light-guiding optical unit 1 according to the present invention. In these embodiments, the light guides 2 are of a rod-like shape and the light-guiding optical units 1 comprise separate collimators 19 of various designs that produce, on a vertical as well as horizontal plane, a beam of parallel light rays 10 that falls onto the routing surface 3, which is used to direct the light rays 10 by refraction directly onto the reflective surfaces 7.

FIGS. 18, 19 and 19a schematically show another embodiment example of a light-guiding optical unit 1 and a prismatic structure 16 used in it according to the invention. The light guide 2, which is fitted with a prismatic structure 16, is of a plate-like shape. The prismatic structure 16 comprises several adjacent rows each of which comprises in the direction from the routing surface 3, arranged after each other and passing into each other, unbroken (smooth) reflective surfaces 7 and broken connecting surfaces 8 that consist of the sections 8a, 8b. The said rows are preferably situated next to each other in such a way that they are mutually shifted, so the reflective surfaces 7 of one row do not concur with the reflective surfaces 7 of the adjacent row. The prismatic structure 16 is configured in such a way that light rays 10 are only directed from the routing surface 3 directly onto the reflective surfaces 7 in such a way that they do not fall onto the production radii 9 (not emphasized in the figures) created between the sections 8a and 8b of the connecting surface 8 and between the section 8a and the reflective surface 7. The section 8a of the connecting surface 8 is descending and the section 8b is ascending.

FIGS. 20 and 21 schematically show another embodiment example of a light-guiding optical unit 1 and a prismatic structure 16 used in it according to the invention. The light guide 2, which is fitted with a prismatic structure 16, is of a plate-like shape. The prismatic structure 16 comprises several adjacent rows each of which comprises in the direction from the routing surface 3, arranged after each other and passing into each other, reflective surfaces 7 and connecting surfaces 8. The said rows are situated next to each other in such a way that they are mutually shifted, so the reflective surfaces 7 of one row do not concur with the reflective surfaces 7 of the adjacent row. The light guide 2 is fed by several light source 4 that emit light rays 10 into the collimator 4. The collimators 4 are integral with the light guide 2 and send light beams of parallel rays 10 onto a common routing surface 3 that routes light rays 10 directly onto the reflective surfaces 7, from which the rays 10 are reflected to the output surface 15 and through the output surface 15 out of the light guide 2.

FIG. 22 shows an axonometric bottom view of another embodiment example of a light-guiding optical unit according to the invention. In this embodiment, the light sources 4 send light rays to routing surfaces 3 that have an approximately parabolic shape. The light sources 4 lie approximately at the focal points of the routing surfaces 3.

FIG. 23 shows a vertical cross-sectional view of another embodiment example of a light-guiding optical unit according to the invention. In this embodiment, the routing surface 3 and the reflective surfaces 7 of the prismatic structure 16 of the light guide 2 are metal-plated. The surface of the light guide 2 comprises a planar routing surface 3 that a beam of parallel light rays 10 created by the collimator 19 falls onto. The light rays 10 are directly routed by the routing surface onto the reflective surfaces 7.

FIG. 24 shows a vertical cross-sectional view of another embodiment example of a light-guiding optical unit according to the invention. In this embodiment, the routing surface 3 and the reflective surfaces 7 of the prismatic structure 16 of the light guide 2 are also metal-plated. The routing surface 3 has an approximately parabolic shape and the light source 4 lies approximately at its focal point. The light rays 10 are directly routed by the routing surface onto the reflective surfaces 7.

LIST OF REFERENCE MARKS

1—light-guiding optical unit
2—light guide

3—routing surface
19—collimator
4—light source
5—reflective surface
6—filter
7—reflective surface
7a—top end
7b—bottom end
7c, 7d—reflective surface section
8—connecting surface
8a, 8b—connecting surface section
9—production radius
10—light ray
10A—deflected light ray
11—light-guiding plate
12—top surface
13—bottom surface
14—lateral surface
15—output surface
16—prismatic structure
17—first reflective surface
18—second reflective surface
17a—top end
17B—bottom end
A, B—region
d—distance

The invention claimed is:

1. A light-guiding optical unit for a light device of motor vehicles comprising a light guide that comprises:
at least one routing surface, wherein the routing surface is a surface of a free-form lens,
a single light source to generate light rays,
a top surface at least a part of which is constituted by an output surface,
and a bottom surface opposite the top surface and fitted with a prismatic structure comprising reflective surfaces,
wherein the reflective surfaces comprise longitudinal axes that are situated on a portion of one or more arches comprising approximate centers of curvature lying in a location of the single light source,
wherein the routing surface is adapted to route light rays emitted from the single light source directly to the reflective surfaces,
wherein the routing surface and the reflective surfaces are mutually arranged in such a way that the routing surface, by means of routing by refraction on this surface or reflection from this surface, directs the light rays onto the prismatic structure in such a way that it only directly lights up the reflective surfaces with the light rays,
wherein the reflective surfaces are configured to route the light rays, which fell directly onto the reflective surfaces from the routing surface and thus directly lighted the reflective surfaces up, to the output surface so that the light rays can exit from the light guide through the output surface.

2. The light-guiding optical unit according to claim 1, wherein the prismatic structure further comprises connecting surfaces, wherein in the direction from the routing surface, each connecting surface connects a top end of a preceding reflective surface to a bottom end of a next reflective surface, wherein a production radius in the place of connection of the connecting surface to the bottom end is situated in the shade produced by the preceding reflective surface, so that no direct light rays fall onto the production radius from the routing surface.

3. The light-guiding optical unit according to claim 1, wherein in the direction from the routing surface, the top end of each reflective surface is closer to the top surface of the light guide than the bottom end of the next reflective surface, and more distant from the top surface of the light guide than the top end of the said next reflective surface.

4. The light-guiding optical unit according to claim 1, wherein the reflective surfaces are not broken and in the direction from the routing surface they are ascending with respect to the top surface.

5. The light-guiding optical unit according to claim 1, wherein the reflective surfaces are broken and comprise at least two sections that are ascending with respect to the top surface in the direction from the routing surface.

6. The light-guiding optical unit according to claim 1, wherein the connecting surfaces are not broken and in the direction from the routing surface they are descending with respect to the top surface.

7. The light-guiding optical unit according to claim 1, wherein the connecting surfaces are broken and comprise at least two sections out of which at least one section is descending with respect to the top surface in the direction from the routing surface.

8. The light-guiding optical unit according to claim 1, wherein the routing surface is configured to produce a parallel or slightly divergent beam of light rays on a vertical plane.

9. The light-guiding optical unit according to claim 1, wherein the routing surface is configured to produce a parallel beam of light rays on a horizontal plane.

10. The light-guiding optical unit according to claim 8, wherein the routing surface is configured to produce a divergent beam of rays on a horizontal plane.

11. The light-guiding optical unit according to claim 1, wherein the routing surface is part of the surface of the light guide.

12. The light-guiding optical unit according to claim 11, wherein the routing surface is at the same time a binding surface to bind light rays to the light guide.

13. The light-guiding optical unit according to claim 1, wherein it comprises a collimator that is situated outside the light guide.

14. The light-guiding optical unit according to claim 1, wherein it comprises a collimator that is an integral part of the light guide.

15. The light-guiding optical unit according to claim 1, wherein the routing surface or its part is metal-plated and/or the reflective surfaces are metal-plated.

16. The light-guiding optical unit according to claim 1, wherein the light guide has the shape of a curved or planar plate.

17. The light-guiding optical unit according to claim 1, wherein the light guide has a rod-like shape while it is straight or curved.

18. The light-guiding optical unit according to claim 17, wherein the light guide has a square, rectangular or mushroom-like profile.

* * * * *